US006282945B1

(12) United States Patent
Weldon et al.

(10) Patent No.: US 6,282,945 B1
(45) Date of Patent: Sep. 4, 2001

(54) METHOD AND SYSTEM FOR AGGRESSIVE CYCLING OF LEAK DETECTION PUMP TO ASCERTAIN VAPOR LEAK SIZE

(75) Inventors: Craig Weldon; John Edward Cook, both of Chatham; Ray Rasokas, Thamesville, all of (CA)

(73) Assignee: Siemens Automotive, Inc., Chatham (CA)

( * ) Notice: Subject to any disclaimer, the term of this patent is extended or adjusted under 35 U.S.C. 154(b) by 0 days.

(21) Appl. No.: 09/465,030

(22) Filed: Dec. 16, 1999

(51) Int. Cl.[7] ............................ G01M 3/04; F02M 33/02
(52) U.S. Cl. ................................................ 73/40; 123/520
(58) Field of Search ................................ 73/40, 37, 45.4, 73/49.2, 49.3; 123/520, 198 D

(56) References Cited

U.S. PATENT DOCUMENTS 5,383,437 1/1995 Cook et al. .......................... 123/520
5,474,050 12/1995 Cook et al. .......................... 123/520
5,499,614 3/1996 Busato et al. ........................ 123/520

*Primary Examiner*—Daniel S. Larkin
*Assistant Examiner*—Jay L Politzer

(57) ABSTRACT

A system and method for detecting leakage from a evaporative emission space of an automotive vehicle fuel system. A reciprocating pump is operated in a pressurizing mode to build pressure in the space toward a nominal test pressure. The pressurizing mode involves operating the pump in a repeating cycle wherein the pump operates alternately in an accelerated pumping mode and a natural frequency pumping mode. During the pressurizing mode, a characteristic of successive occurrences of the natural frequency pumping mode indicative of pressure in the space is measured. The number of times the cycle repeats is counted and compared to a predefined reference. When the cycle count exceeds the predefined reference, the test continues at a lower resolution for detecting leakage, and when the cycle count does not exceed the predefined reference and a measurement of the characteristic of successive occurrences of the natural frequency pumping mode indicative of pressure in the space exceeds a predetermined reference pressure, the test continues at a higher resolution for detecting leakage. The invention is useful when overall test time is limited.

24 Claims, 3 Drawing Sheets

METHOD AND SYSTEM FOR AGGRESSIVE CYCLING OF LEAK DETECTION PUMP TO ASCERTAIN VAPOR LEAK SIZE

INCORPORATION BY REFERENCE

Commonly owned U.S. Pat. Nos. 5,383,437; 5,474,050; and 5,499,614 are expressly incorporated herein by reference.

FIELD OF THE INVENTION

This invention relates generally to the detection of gas leakage from a contained volume, such as fuel vapor leakage from an evaporative emission space of an automotive vehicle fuel system. More particularly the invention relates to a new and unique system and method for aggressively cycling a leak detection pump of the type disclosed in the patents incorporated by reference so that a meaningful leak test can be performed within a time interval that is significantly less than the time interval required for pressure in the space to stabilize at a final test pressure. The invention also relates to a system and method for leak testing with different degrees of resolution depending on the liquid level in a tank, particularly the ability to perform a leak test with a greater degree of resolution when the tank is more full.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake system of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake system through the canister purge valve. For example, fuel vapors may be purged to an intake manifold of an engine intake system by the opening of a CPS-type valve in response to a signal from the engine management computer, causing the valve to open in an amount that allows intake manifold vacuum to draw fuel vapors that are present in the tank headspace, and/or stored in the canister, for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure.

It is believed fair to say that from a historical viewpoint two basic types of vapor leak detection systems for determining integrity of an evaporative emission space have evolved: a positive pressure system that performs a test by positively pressurizing an evaporative emission space; and a negative pressure (i.e. vacuum) system that performs a test by negatively pressurizing (i.e. drawing vacuum in) an evaporative emission space. The former may utilize a pressurizing device, such as a pump, for pressurizing the evaporative emission space; the latter may utilize either a devoted device, such as a vacuum pump, or engine manifold vacuum created by running of the engine.

Commonly owned U.S. Patents and Patent Applications disclose various systems, devices, modules, and methods for performing evaporative emission leak detection tests by positive and negative pressurization of the evaporative emission space being tested. Commonly owned U.S. Pat. No. 5,383,437 discloses the use of a reciprocating pump that alternately executes a downstroke and an upstroke to create positive pressure in the evaporative emission space. Commonly owned U.S. Pat. No. 5,474,050 embodies advantages of the pump of U.S. Pat. No. 5,383,437 while providing certain improvements in the organization and arrangement of a reciprocating pump.

The pump comprises a housing having an interior that is divided by a movable wall into a pumping chamber to one side of the movable wall and a vacuum chamber to the other side. One cycle of pump reciprocation comprises a downstroke followed by an upstroke. During a downstroke, a charge of air that is in the pumping chamber is compressed by the motion of the movable wall, and a portion of the compressed charge is expelled through a one-way valve, and ultimately into the evaporative emission space being tested. The movable wall moves in a direction that contracts the pumping chamber volume while expanding the vacuum chamber volume, and the prime mover for the downstroke motion is a mechanical spring that is disposed within the vacuum chamber to act on the movable wall. During a downstroke, the spring releases stored energy to move the wall and force air through the one-way valve. At the end of a downstroke, further compression of the air charge ceases, and so the consequent lack of further compression prevents the one-way valve from remaining open.

During an upstroke, the movable wall moves in a direction that expands the volume of the pumping chamber, while contracting that of the vacuum chamber. During the upstroke, the one-way valve remains closed, but a pressure differential is created across a second one-way valve causing the latter valve to open. Atmospheric air can then flow through the second valve to enter the pumping chamber. At the end of an upstroke, a charge of air has once again been created in the pumping chamber, and at that time, the second valve closes due to lack of sufficient pressure differential to maintain it open. The pumping mechanism can then again be downstroked.

The upstroke motion of the movable wall increasingly compresses the mechanical spring to restore the energy that was released during the immediately preceding downstroke. Energy for executing an upstroke is obtained from a vacuum source, intake manifold vacuum in particular. During an upstroke a solenoid valve operates to a condition that communicates the vacuum chamber of the pump to manifold vacuum. The vacuum is strong enough to have moved the movable wall to a position where, at the end of an upstroke, the pumping chamber volume is at a maximum and that of the vacuum chamber is at a minimum. A downstroke is initiated by operating the solenoid valve to a condition that vents the vacuum chamber to atmosphere. With loss of vacuum in the vacuum chamber, the spring can be effective to move the movable wall on a downstroke.

Operation of the solenoid valve to its respective conditions is controlled by a suitable sensor or switch that is disposed in association with the pump to sense when the movable wall has reached the end of a downstroke. When the sensor or switch senses the end of a downstroke, it delivers, to an associated controller, a signal that is processed by the controller to operate the solenoid valve to communicate vacuum to the vacuum chamber. The controller operates the solenoid valve to that condition long enough to assure full upstroking, and then it operates the solenoid to vent the vacuum chamber to atmosphere so that the next downstroke can commence. At the beginning of a downstroke, the pumping chamber holds a know volume of air at atmospheric pressure. The pump is a displacement pump that has a uniform swept volume, meaning that it displaces a uniform volume of air from the pumping chamber on each full downstroke. The mass of air displaced during each full downstroke is uniform, but as the pressure in the space being tested increases, the air must be compressed to progressively increasing pressure. Because the pumping chamber contains the same known volume of air at the same known pressure at the beginning of each downstroke, and because the stroke is well defined, the time duration of the downstroke correlates with pressure in the space being tested.

The pumping mechanism is repeatedly stroked in the foregoing manner as the test proceeds. Assuming that there is no gross leak that prevents the pressure from increasing toward a nominal test pressure suitable for obtaining a leak measurement, the amount of time required to execute a downstroke becomes increasingly longer as the nominal test pressure is approached. For an evaporative emission space that has zero leakage, the pressure will eventually reach the nominal test pressure, and pump stroking will cease when that occurs. For an evaporative emission space that has small leakage less than a gross leak, the pressure will stabilize substantially at the nominal test pressure, but the pump will continue stroking because it is continually striving to make up for the leakage that is occurring. The duration of the pump downstroke is indicative of the effective leak size, and that duration decreases with increasing effective leak size. Decreasing time duration of the pump downstroke means that the pump is stroking at increasing frequency, and hence a correlation between effective leak size and pump stroke frequency also exists. Therefore, a measurement of the time interval from the end of one downstroke, as sensed by the previously mentioned sensor or switch, until the end of the immediately following downstroke, as sensed by the sensor or switch, yields a substantially accurate measurement of effective leak size. Stated another way, the rate at which the pump cycles, i.e. strokes, is indicative of effective leak size once nominal test pressure has been reached.

The accuracy of this type of test is premised on substantially constant volume of the test space and on an ability to attain nominal test pressure stability. An ability to attain nominal test pressure stability within a reasonable period of time may be a factor in minimizing the total test time, and commercial acceptance of such leak detection systems may be conditioned on accomplishing a test in fairly short overall test time. It is therefore considered desirable for stability of nominal test pressure to be promptly achieved. Because change in the size of a leak during a test would affect test accuracy, it is understood that a test result is valid only when such a change does not occur during a test.

It has been observed however that the environment of an automotive vehicle may be hostile to promptly reaching nominal test pressure stability. To some extent, the nature of the test itself may also be responsible. The pump's compression of air is not an adiabatic process, and therefore, the compression also heats the air that is being pumped into the evaporative emission space. The added heat will inherently dissipate over time to the surroundings, but as it does, there is corresponding decrease in pressure as required by physical phenomena embodied in known gas laws. Hence, for a given leak indication system of this type in a vehicle, it appears that physical laws establish some minimum time interval for attaining nominal test pressure stability, thereby precluding the shortening of that interval below that minimum.

Commonly owned U.S. Pat. No. 5,499,614 discloses apparatus and method for operating a leak detection pump of the type just described in a manner that can shorten the overall test time. The pump is operated initially in an accelerated pumping mode to more rapidly build pressure in the evaporative emission space being tested, and once pressure has built up to a certain level, the pump is operated in a natural frequency, or test, mode where meaningful measurement of leakage becomes possible.

Briefly, the natural frequency mode is the mode of operation described in U.S. Pat. Nos. 5,474,050 and 5,383,437 where the pump executes a succession of full upstrokes and full downstrokes. To assure that the pump executes a full upstroke, the solenoid valve is operated to deliver manifold vacuum to the pump for a predetermined amount of time sufficiently long to guarantee that the movable wall of the pump will be fully retracted even when the available manifold vacuum is at its smallest. Because the movable wall will retract quicker when manifold vacuum is larger, the allowed retraction time will be more than enough to assure full retraction for larger vacuums, in which case, the movable wall will hover in fully retracted position for an amount of time that increases with increasing manifold vacuum. The hover time is dead time that could otherwise be utilized for downstroking the movable wall.

A further contributor to test time arises because of the nature of the pump mechanism. During an initial portion of a downstroke that commences when the movable wall is in fully retracted position, the compressed spring exerts a greater force than during a final portion when the movable wall is approaching the end of a full downstroke. Stroking the pump over all or some of such an initial portion of a full downstroke can provide more efficient, and hence more rapid, pressurizing, but a meaningful leak measurement still involves measuring the time required for downstroking of the movable wall over a well defined distance, such as a full downstroke, once pressure has built to a suitable level. Hence, operating the pump initially in the accelerated pumping mode and then the natural frequency mode can enable a meaningful test to be accomplished in shorter time than if the natural frequency mode is used exclusively throughout a test.

SUMMARY OF THE INVENTION

One general aspect of the invention relates to further improvements in leak indication systems and methods, including a novel system and method that can aggressively cycle a leak detection pump of the type disclosed in the patents incorporated by reference so that a meaningful leak test can be performed within a time interval that is significantly less than the time interval required for pressure in the contained volume to stabilize at a final test pressure.

One general aspect of the within claimed invention relates to a method for detecting leakage from a contained volume for holding volatile liquid. The method comprises: operating a reciprocating pump in a pressurizing mode to build pressure in headspace of the contained volume toward a nominal test pressure, the pressurizing mode comprising operating the pump in a repeating cycle that comprises operating the pump alternately in an accelerated pumping mode and a natural frequency pumping mode; during the pressurizing mode, measuring a characteristic of successive occurrences of the natural frequency pumping mode indicative of pressure in the headspace; counting the number of times the cycle repeats and comparing the count to a predefined reference; when the cycle count exceeds the predefined reference, continuing the test at a lower resolution for detecting leakage; and when the cycle count does not exceed the predefined reference and a measurement of the characteristic of successive occurrences of the natural frequency pumping mode indicative of pressure in the headspace exceeds a predetermined reference pressure, continuing the test at a higher resolution for detecting leakage.

Another general aspect relates to a method as just described wherein the headspace comprises evaporative emission space of an automotive vehicle fuel system.

Still another general aspect relates to systems embodying these methods.

Still another general aspect relates to a method for detecting leakage of vapor from an evaporative emission space of a fuel storage system of an automotive vehicle for storing volatile fuel consumed by the vehicle during operation in which: the evaporative emission space is pressurized toward a nominal test pressure suitable for detecting leakage; during the pressurizing step, pressure in the evaporative emission space is correlated with elapsed test time; the test is continued at a relatively lower leak detection resolution when the correlating step indicates a relatively larger leak; and the test is continued at a relatively higher leak detection resolution when the correlating step indicates a relatively smaller leak.

According to an ancillary aspect of the invention, a test that is being conducted at higher resolution requires that the vehicle remain static throughout the test time, and testing that would otherwise be conducted at a higher resolution will revert to a lower resolution test if the vehicle fails to remain static throughout the test time.

Further aspects will be seen in the ensuing description, claims, and accompanying drawings.

BRIEF DESCRIPTION OF THE DRAWINGS

The accompanying drawings, which are incorporated herein and constitute part of this specification, relate to one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
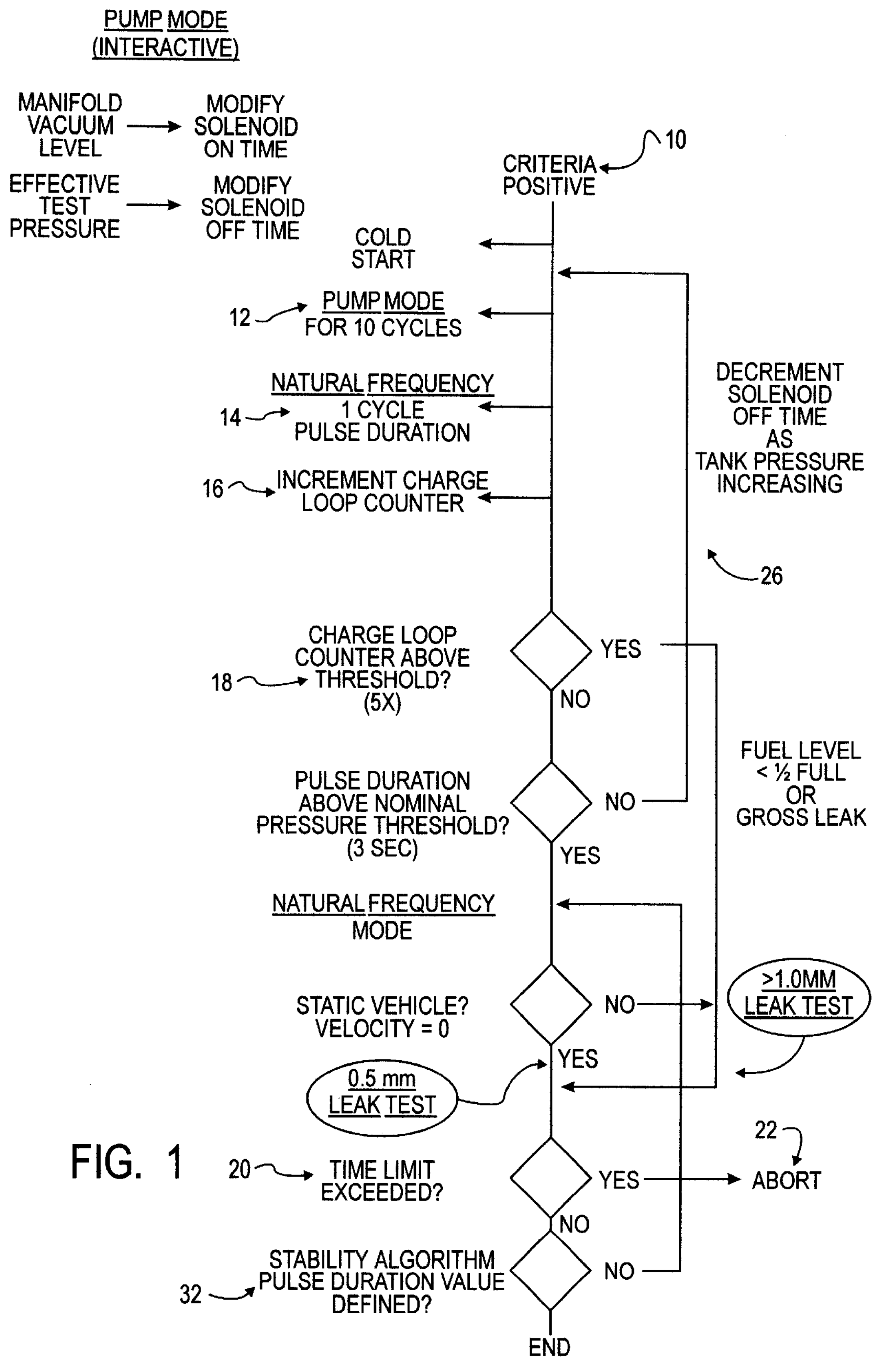
FIG. 1 is a flow diagram of steps of a method that embodies principles of the invention.

A pump, for which practice of the present invention is suited, has already been described above. That description explained that as pressure builds toward the nominal test pressure, the amount of time required for the pump to execute a downstroke becomes increasingly longer. In other words, the frequency at which the pump reciprocates, progressively decreases as pressure increases. Such a mode of pump operation is, for convenience, be referred to as the natural frequency, or test, mode of operation, and the amount of time required for the pump to execute a full downstroke, as a Pulse Duration Time Interval.

Correspondingly, the reader will understand that the time interval from the sensing of the end of one full downstroke to the sensing of the end of the immediately succeeding full downstroke also becomes increasingly longer. Stated another way, the frequency at which the end of the downstroke is sensed, i.e. the frequency at which the pump reciprocates, progressively decreases as pressure increases. The time interval between such immediately consecutive sensings is substantially equal to a Pulse Duration Time Interval, but is just slightly longer due to the inclusion of a short time interval for resetting (i.e. upstroking) the pump at the end of a downstroke.

For reducing overall time for a leak test in comparison to a leak test that uses the natural frequency mode exclusively throughout, the pump may be operated first in the accelerated pumping mode to more rapidly build pressure, and thereafter in the natural frequency mode. In the accelerated pumping mode, a signal from the controller that operates the pump terminates a downstroke before completion of the full downstroke that otherwise would trip the downstroke sensor, or switch, that senses the end of the downstroke. In that way, the spring whose force is compressing the air in the pumping chamber during the downstroke is not allowed to relax to the extent that it otherwise would if a full downstroke were being executed, and hence the spring works within a region where it is exerting larger force on the air being compressed. Because the downstroke is being interrupted early in the accelerated pumping mode, the frequency at which the pump is being stroked is greater than if would be if allowed to complete full downstrokes. The accelerated pumping mode may seek to optimize the on-off times of the solenoid through which manifold vacuum and vent air are delivered to the pump so that hovering time is minimized and/or eliminated. The accelerated pumping mode is, as mentioned, described in commonly owned U.S. Pat. No. 5,499,614.

Fuel level in a tank may be a factor in certain types of leak tests because it affects the headspace volume. A tank that is less full has a larger headspace volume that must be pressurized than when the tank is more full. Therefore in order to pressurize the headspace to nominal test pressure, even when using the accelerated pumping mode, a pump of the type that has been described above will have to operate longer when a tank is less full than it will when the tank is more full. If the amount of time allowed for a leak test is limited, the headspace volume may, for tank fuel level below a certain level, be too large in relation to the pumping capacity of the particular pump to enable the pump to pressurize the headspace to nominal test pressure within the specified time limit. While sizing a pump to be effective for all levels of fuel in a tank even down to the smallest level could solve the problem, such a solution would increase pump size, make the pump more costly, and add to vehicle weight, all of which are considered undesirable by motor vehicle manufacturers.

A better solution that is provided in accordance with principles of the present invention endows a leak test system and method with the ability to perform a meaningful leak test within the constraint of a predefined test time limit both when the tank is more full and when the tank is less full, but with different degrees of resolution in the two cases. When the tank is more full, leaks having an effective size greater than a certain smaller threshold can be distinguished from smaller ones. When the tank is less full, leaks having an effective size greater than a certain larger threshold can be distinguished from smaller ones. Moreover, a test can be conducted without having to use a signal from a fuel level sensor. The invention accommodates a need to perform a leak test within a defined time limit by performing a test with an acceptable degree of resolution when a tank is less full, and with even better resolution when the tank is more full.

FIG. 1 illustrates steps of an example of the inventive method using a test system, including a reciprocating pump, of the type described above.

Figure 4:
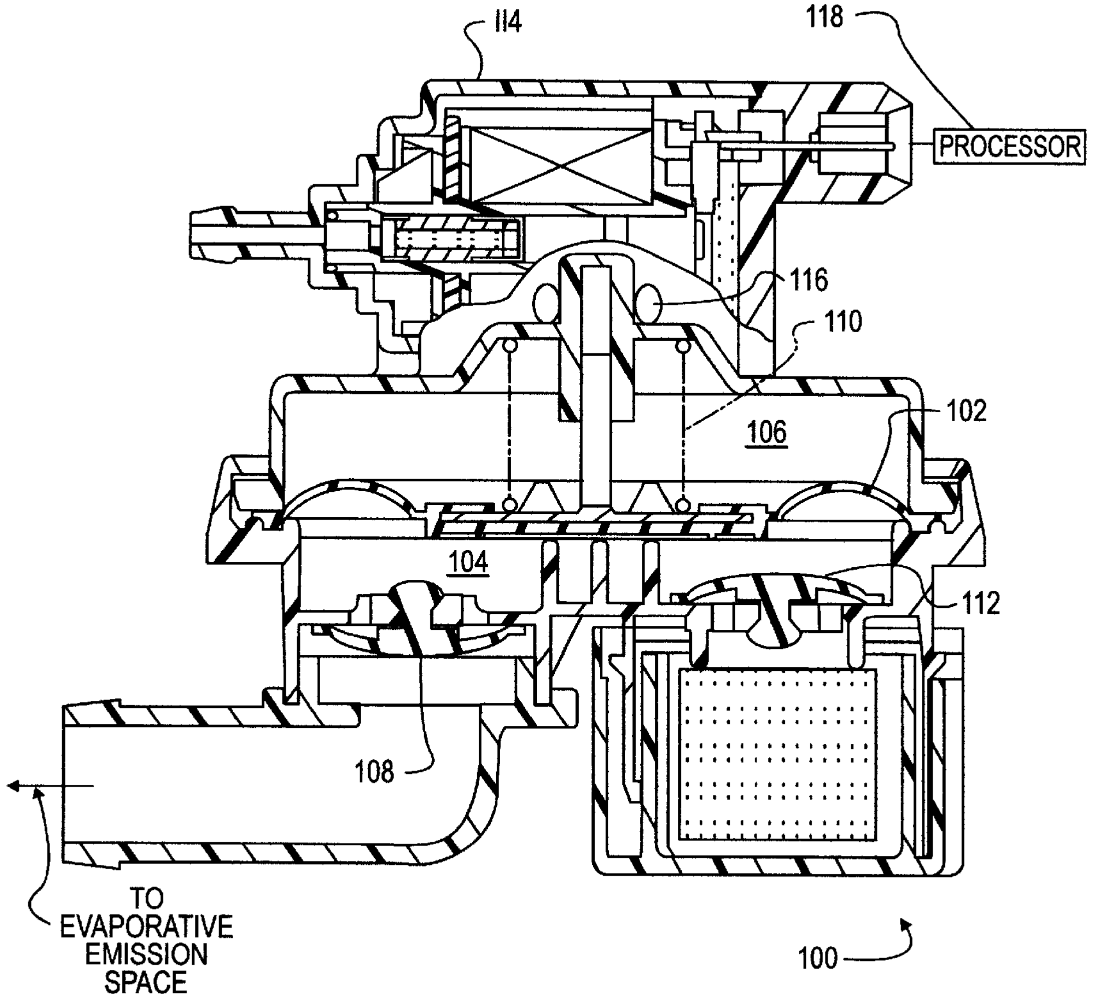
FIG. 4 is a view of a system that operates in accordance with principles of the present invention.

The test system is portrayed in FIG. 4 and comprises a reciprocating pump 100 having a housing that is divided by a movable wall 102 into a pumping chamber 104 to one side of the movable wall and a vacuum chamber 106 to the other side. One cycle of pump reciprocation comprises a downstroke followed by an upstroke. During a downstroke, a charge of air that is in pumping chamber 104 is compressed by the motion of movable wall 102, and a portion of the compressed charge is expelled through a one-way valve 108, and ultimately into the evaporative emission space being tested. Wall 102 moves in a direction that contracts the pumping chamber volume while expanding the vacuum chamber volume, with the prime mover for the downstroke motion being a mechanical spring 110 that is disposed within vacuum chamber 106 to act on wall 102. During a downstroke, the spring releases stored energy to move the wall and force air through the one-way valve. At the end of a downstroke, further compression of the air charge ceases, and so the consequent lack of further compression prevents the one-way valve from remaining open.

During an upstroke, movable wall 102 moves in a direction that expands the volume of pumping chamber 104, while contracting that of vacuum chamber 106. During the upstroke, one-way valve 108 remains closed, but a pressure differential is created across a second one-way valve 112 causing the latter valve to open. Atmospheric air can then flow through the second valve to enter the pumping chamber. At the end of an upstroke, a charge of air has once again been created in the pumping chamber, and at that time, the second valve closes due to lack of sufficient pressure differential to maintain it open. The pumping mechanism can then again be downstroked.

The upstroke motion of movable wall 102 increasingly compresses mechanical spring 110 to restore the energy that was released during the immediately preceding downstroke. Energy for executing an upstroke is obtained from a vacuum source, intake manifold vacuum in particular. During an upstroke, a solenoid valve 114 operates to a condition that communicates the vacuum chamber of the pump to manifold vacuum. The vacuum is strong enough to have moved movable wall 102 to a position where, at the end of an upstroke, the pumping chamber volume is at a maximum and that of the vacuum chamber is at a minimum. A downstroke is initiated by operating the solenoid valve to a condition that vents the vacuum chamber to atmosphere. With loss of vacuum in the vacuum chamber, spring 110 can be effective to move wall 102 on a downstroke.

Operation of the solenoid valve to its respective conditions is controlled by a suitable sensor or switch 116 that is disposed in association with the pump to sense when movable wall 102 has reached the end of a downstroke. When the sensor or switch senses the end of a downstroke, it delivers, to an associated processor 118, a signal that is processed to operate solenoid valve 114 to communicate vacuum to the vacuum chamber. The processor operates the solenoid valve to that condition long enough to assure full upstroking, and then it operates the solenoid to vent the vacuum chamber to atmosphere so that the next downstroke can commence.

At the beginning of a downstroke, the pumping chamber 104 holds a known volume of air at atmospheric pressure. The pump is a displacement pump that has a uniform swept volume, meaning that it displaces a uniform volume of air from the pumping chamber on each full downstroke. The mass of air displaced during each full downstroke is uniform, but as the pressure in the space being tested increases, the air must be compressed to progressively increasing pressure. Because the pumping chamber contains the same known volume of air at the same known pressure at the beginning of each downstroke, and because the stroke is well defined, the time duration of the downstroke correlates with pressure in the space being tested. The pumping mechanism is repeatedly stroked in the foregoing manner as the test proceeds.

The processor electronically processes data to perform calculations involved in the test method that is disclosed in FIG. 1, which will now be described in detail. In order for a test to proceed, certain criteria must be positive (reference numeral 10). If they are, an electronic timer is started, and the pump is operated in the accelerated pumping mode for a certain number of cycles, ten cycles in the present example, each cycle being a partial downstroke (reference numeral 12). The pump next is operated in the natural frequency mode for one cycle, that cycle being a full downstroke (reference numeral 14). This sequence of charging (i.e. pressurizing) the space under test by alternately operating the pump in the accelerated pumping mode and the natural frequency mode, then repeats. As pressure builds in the space under test, the pump downstroke may be made progressively shorter to cause the pump spring to be active over a progressively smaller extent of its range toward the objective of building pressure in the shortest possible time consistent with other considerations. This is indicated in the drawing by the phrase, Decrement Solenoid Off Time As Tank Pressure Increasing.

The electric control that operates the pump contains a sequence counter that is utilized to record the number of times that the sequence repeats. The counter is incremented at the end of each sequence (reference numeral 16). After incrementing, the value in the counter is compared with a preset value that is indicative of reaching a test pressure at or close to a nominal test pressure (reference numeral 18) without excessive overpressure. Should the counter value exceed the preset value, the elapsed time, as measured by the timer, is compared against a predefined time limit (reference numeral 20). If the elapsed time exceeds the time limit, the leak test is aborted (reference numeral 22) because the occurrence of such an event indicates that pressure in the space under test did not build sufficiently rapidly within a predefined time and therefore suggests either too low a fuel level in the tank (i.e. headspace volume too large) and/or a gross leak. However, if the elapsed time does not exceed the time limit, the test continues, but with a lower degree of resolution that distinguishes between leaks above a certain lower resolution threshold, such as leaks larger than 1.0 mm effective diameter as in the present example, and those below that lower resolution threshold.

The test is therefore performed with a lower degree of resolution, designated in the drawing as 1.0 mm Leak Test.

The control operates the pump in the natural frequency mode with the expectation that the pressure will eventually stabilize at a nominal test pressure, even if there is a leak that is less than a gross leak. The test comprises an iterative loop during each iteration of which a check is made to detect incipiency of pressure stabilization (reference numeral 32) that would allow the test to conclude with a leak determination. A further step (reference numeral 30) of each iteration checks to make sure the vehicle is remaining static, i.e. not in motion, namely being stopped for a sufficient amount of time for any reason, such as being parked with the engine running or stopped in traffic. Because the process has determined in this instance that the test will be completed at the lower resolution, failure of the vehicle to remain static has no bearing on further conduct of the test in this particular example. The elapsed test time is also checked during each iteration, and a test will be aborted anytime that the elapsed test time exceeds the predefined limit.

If the count in the sequence counter did not, on the other hand, exceed the preset limit when step 18 was executed, the pulse duration is compared to a predefined nominal value, three seconds for example in the present embodiment (reference numeral 24). If the measured pulse duration remains below that nominal value, the sequence reiterates (reference numeral 26) because the measured pulse duration indicates that suitable test pressure, near or at nominal, has not yet been attained. On the other hand, a Pulse Duration Time Interval that exceeds that nominal value indicates that suitable test pressure at or near nominal has been attained, in which event all further cycling of the pump during the test is conducted in the natural frequency mode (reference numeral 28). Unless step 30 detects that the vehicle has ceased to remain static, in which case the test will be conducted with the lower degree of resolution, the test is conducted with a higher degree of resolution.

If it is assumed that the vehicle remains static, a Pulse Duration Time Interval measurement that exceeds the nominal value indicates that the test is capable of distinguishing between leaks above a certain higher resolution threshold, such as leaks larger than 0.5 mm effective diameter as in the present example, and those below that higher resolution threshold. The test therefore continues in an iterative loop marked 0.5 mm Leak Test in the drawing.

As long as the vehicle remains static and the elapsed test time does not exceed the predefined test time limit, the control continues to operate the pump in the natural frequency mode with the expectation that the pressure will eventually stabilize at a nominal test pressure, even if there is a leak that is less than a gross leak.

Figure 2:
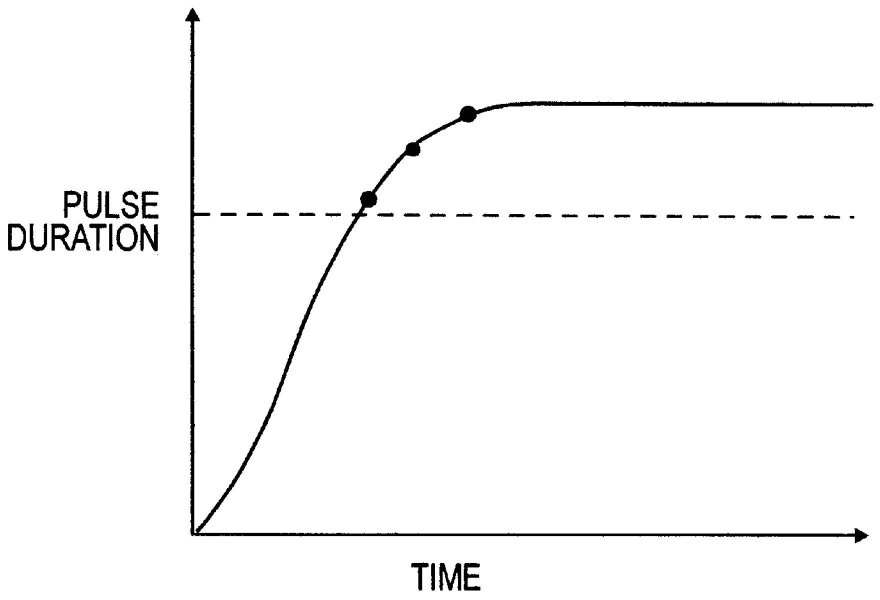
FIGS. 2 and 3 are respective graph plots useful in explaining certain aspects of one of the steps of FIG. 1.
Figure 3:
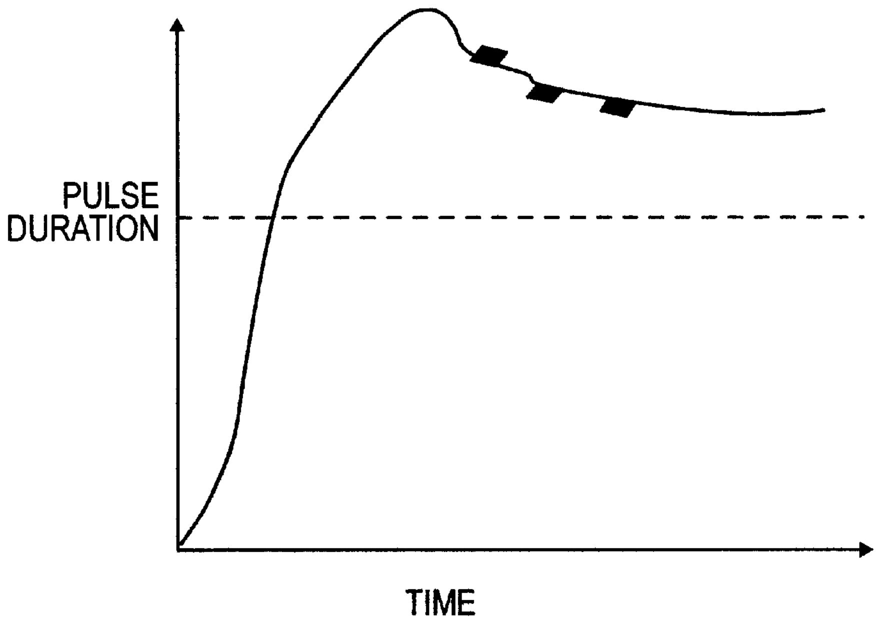

Step 32 detects incipient pressure stability so that actual stability does have to be attained. A time-saving method for detecting incipient stability and predicting final stabilized pressure is to utilize the method disclosed in commonly owned, pending U.S. Pat. No. 6,253,598, filed Dec. 16, 1999, METHOD AND SYSTEM FOR PREDICTING STABILIZED TIME DURATION OF VAPOR LEAK DETECTION PUMP STROKES. Another way is detect incipient stability is to take measurements of the Pulse Duration Test Interval. An occurrence of three successive measurements that are progressively longer (as in FIG. 2) can serve to indicate that the particular leak test threshold, 0.5 mm effective diameter or 1.0 mm effective diameter, has been passed. If that is not the case, as in the example of FIG. 3, the test is not yet conclusive. FIG. 3 could be representative of thermal equilibrium occurring due to too rapid pressurization or a change in ambient barometric pressure.

When the tank is more full, less time is required to develop nominal test pressure, and so the higher degree of resolution of a test measurement becomes possible. In the present example, this ability allows a high resolution test to distinguish between leaks that are larger than 0.5 mm effective diameter and ones that are smaller when the tank is more full. When the tank is less full, a lower resolution test that distinguish between leaks that are larger than 1.0 mm effective diameter and ones that are smaller in the present example, can still be conducted. If insufficient pressure is developed within the allotted test time, the test is aborted. Testing is conducted with the objective of pressurizing the evaporative emission space as rapidly as possible without thermodynamic factors that could impair accuracy or prolong test time coming into play.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A method for detecting leakage from a contained volume for holding volatile liquid during a leak test, the method comprising:

operating a reciprocating pump in a pressurizing mode to build pressure in headspace of the contained volume toward a nominal test pressure, the pressurizing mode comprising operating the pump in a repeating cycle that comprises operating the pump alternately in an accelerated pumping mode and a natural frequency pumping mode;

during the pressurizing mode, measuring a characteristic of successive occurrences of the natural frequency pumping mode indicative of pressure in the headspace;

counting the number of times the cycle repeats and comparing the count to a predefined reference;

when the cycle count exceeds the predefined reference, continuing the test at a lower resolution for detecting leakage; and when the cycle count does not exceed the predefined reference and a measurement of the characteristic of successive occurrences of the natural frequency pumping mode indicative of pressure in the headspace exceeds a predetermined reference pressure, continuing the test at a higher resolution for detecting leakage.

2. A method as set forth in claim 1 including the steps of timing the duration of the test and when elapsed test time exceeds a predefined time limit, terminating the test.

3. A method as set forth in claim 2 including the step of indicating termination of the test as an aborted test if incipient stability of pressurization is not detected before elapsed test time exceeds the predefined time limit.

4. A method as set forth in claim 1 including the steps of timing duration of the test and detecting incipient stability of pressurization before elapsed test time exceeds a predefined time limit.

5. A method as set forth in claim 4 including the steps of predicting a final stabilized value of pressurization and of correlating that value with the resolution at which the test continued based on the cycle count.

6. A method as set forth in claim 1 in which the pump operates to build superatmospheric pressure in the headspace.

7. A method for detecting, during a leak test, leakage of vapor from an evaporative emission space of a fuel storage system of an automotive vehicle for storing volatile fuel consumed by the vehicle during operation, the method comprising:

operating a reciprocating pump in a pressurizing mode to build pressure in the evaporative emission space toward a nominal test pressure, the pressurizing mode comprising operating the pump in a repeating cycle that comprises operating the pump alternately in an accelerated pumping mode and a natural frequency pumping mode;

during the pressurizing mode, measuring a characteristic of successive occurrences of the natural frequency pumping mode indicative of pressure in the evaporative emission space;

counting the number of times the cycle repeats and comparing the count to a predefined reference;

when the cycle count exceeds the predefined reference, continuing the test at a lower resolution for detecting leakage; and when the cycle count does not exceed the predefined reference and a measurement of the characteristic of successive occurrences of the natural frequency pumping mode indicative of pressure in the evaporative emission space exceeds a predetermined reference pressure, continuing the test at a higher resolution for detecting leakage.

8. A method as set forth in claim 7 including the steps of timing the duration of the test and when elapsed time exceeds a predefined time limit, terminating the test.

9. A method as set forth in claim 8 including indicating the step of indicating termination of the test as an aborted test if incipient stability of pressurization is not detected before elapsed test time exceeds the predefined time limit.

10. A method as set forth in claim 7 including the steps of timing duration of the test and detecting incipient stability of pressurization before elapsed test time exceeds a predefined time limit.

11. A method as set forth in claim 10 including the steps of predicting a final stabilized value of pressurization and of correlating that value with the resolution at which the test continued based on the cycle count.

12. A method as set forth in claim 7 in which the pump operates to build superatmospheric pressure in the headspace.

13. A method as set forth in claim 7 including the steps of detecting the vehicle being static after a cycle of the natural frequency mode and inhibiting performance of the higher resolution test if a non-static condition of the vehicle is detected.

14. A system for indicating leakage from a contained volume for holding volatile liquid during a leak test, the system comprising:

a reciprocating pump for building pressure in headspace of the contained volume toward a nominal test pressure; and a control, including a processor, for: operating the pump in a pressurizing mode comprising operating the pump in a repeating cycle that comprises operating the pump alternately in an accelerated pumping mode and a natural frequency pumping mode; measuring a characteristic of successive occurrences of the natural frequency pumping mode indicative of pressure in the headspace while in the pressurizing mode; counting the number of times the cycle repeats and comparing the count to a predefined reference; continuing the test at a lower resolution for detecting leakage when the cycle count exceeds the predefined reference; and continuing the test at a higher resolution for detecting leakage when the cycle count does not exceed the predefined reference and a measurement of the characteristic of successive occurrences of the natural frequency pumping mode indicative of pressure in the headspace exceeds a predetermined reference pressure.

15. A system as set forth in claim 14 in which the control is configured to time the duration of the test and to terminate the test when elapsed test time exceeds a predefined time limit.

16. A system as set forth in claim 15 in which the control is configured to indicate termination of the test as an aborted test if incipient stability of pressurization is not detected before elapsed test time exceeds the predefined time limit.

17. A system as set forth in claim 14 in which the control is configured to time duration of the test and detect incipient stability of pressurization before elapsed test time exceeds a predefined time limit.

18. A system as set forth in claim 17 in which the control is configured to predict a final stabilized value of pressurization and correlate that value with the resolution at which the test continued based on the cycle count.

19. A system as set forth in claim 15 in which the pump is effective to build superatmospheric pressure in the headspace.

20. A system for detecting leakage, during a leak test, of vapor from an evaporative emission space of a fuel storage system of an automotive vehicle for storing volatile fuel consumed by the vehicle during operation, the system comprising:

a reciprocating pump for building pressure in evaporative emission space toward a nominal test pressure; and a control, including a processor, for: operating the pump in a pressurizing mode comprising operating the pump in a repeating cycle that comprises operating the pump alternately in an accelerated pumping mode and a natural frequency pumping mode; measuring a characteristic of successive occurrences of the natural frequency pumping mode indicative of pressure in the evaporative emission space while in the pressurizing mode; counting the number of times the cycle repeats and comparing the count to a predefined reference; continuing the test at a lower resolution for detecting leakage when the cycle count exceeds the predefined reference; and continuing the test at a higher resolution for detecting leakage when the cycle count does not exceed the predefined reference and a measurement of the characteristic of successive occurrences of the natural frequency pumping mode indicative of pressure in the evaporative emission space exceeds a predetermined reference pressure.

21. A system as set forth in claim 20 in which the control is configured to time the duration of the test and to terminate the test when elapsed test time exceeds a predefined time limit.

22. A system as set forth in claim 21 in which the control is configured to indicate termination of the test as an aborted test if incipient stability of pressurization is not detected before elapsed test time exceeds the predefined time limit.

23. A system as set forth in claim 20 in which the control is configured to time duration of the test and detect incipient stability of pressurization before elapsed test time exceeds a predefined time limit.

24. A system as set forth in claim 23 in which the control is configured to predict a final stabilized value of pressurization and correlate that value with the resolution at which the test continued based on the cycle count.

* * * * *